F. L. SLOCUM.
PROCESS OF TREATING MATERIAL WITH GAS OR VAPOR.
APPLICATION FILED SEPT. 21, 1917.
1,315,532.
Patented Sept. 9, 1919.
2 SHEETS—SHEET 2.
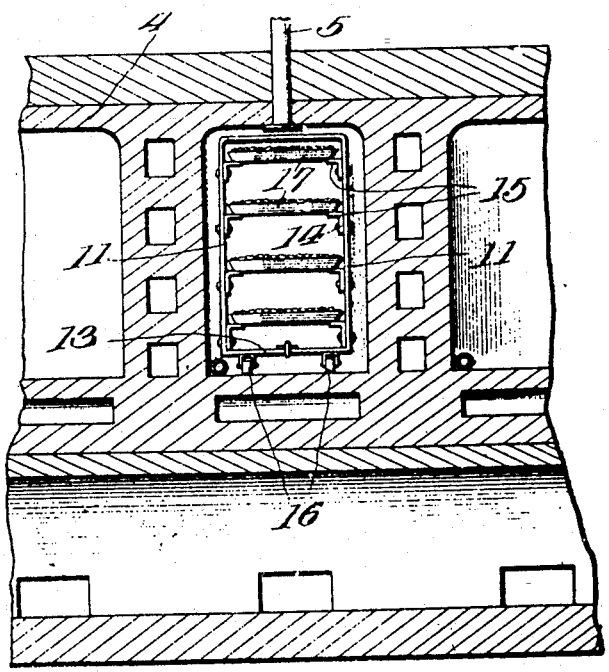
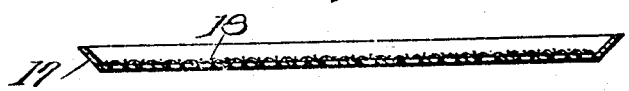
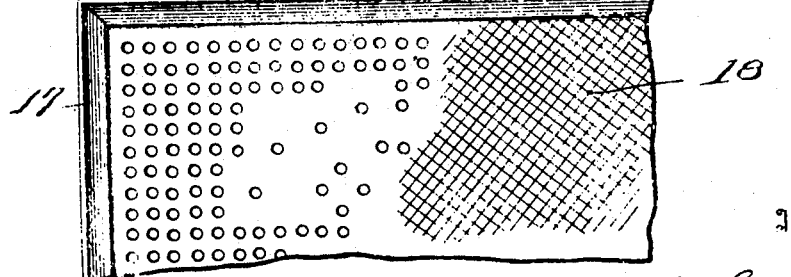

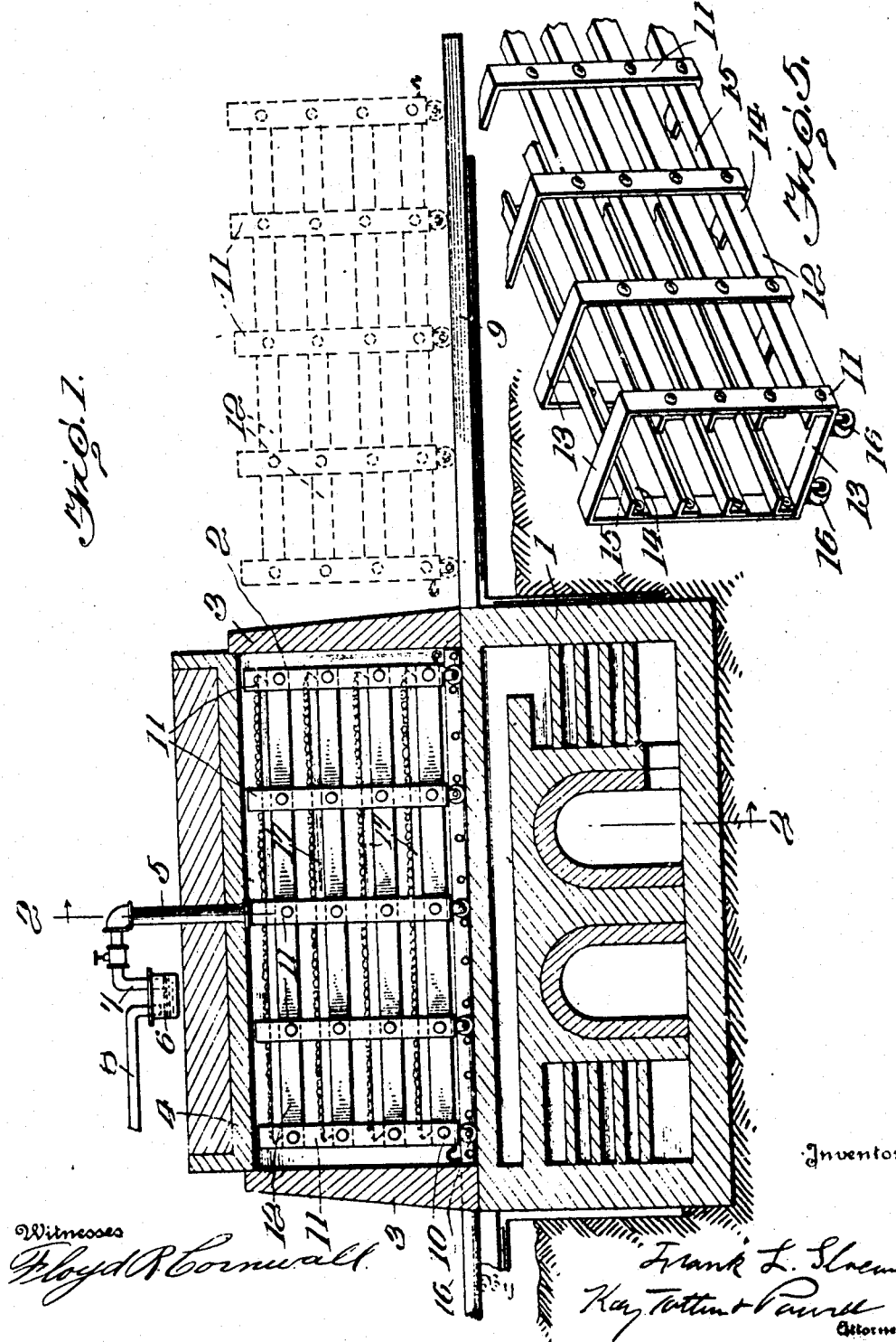

UNITED STATES PATENT OFFICE.

FRANK L. SLOCUM, OF PITTSBURGH, PENNSYLVANIA.

PROCESS OF TREATING MATERIAL WITH GAS OR VAPOR.

1,315,532.   Specification of Letters Patent.   Patented Sept. 9, 1919.

Application filed September 21, 1917. Serial No. 192,483.

*To all whom it may concern:*

Be it known that I, FRANK L. SLOCUM, a citizen of the United States, and resident of Pittsburgh, in the county of Allegheny and State of Pennsylvania, have invented a new and useful Improvement in Processes of Treating Material with Gas or Vapor; and I do hereby declare the following to be a full, clear, and exact description thereof.

My invention relates to the treating of a solid with gases or vapors and particularly contemplates the combination of a series or several series of steps in one continuous process.

As an illustration of one unitary process in which my invention may be embodied, I will describe the treating of a material such as a carbid with nitrogen gas for the purpose of producing a nitrified product upon which further treatment may take place for producing desired products from said nitrified material.

In the production of ammonia, for example, from atmospheric nitrogen, a series of reactions takes place as follows: first, the formation of a nitrogen containing compound by means of the action of nitrogen gas on a carbid under suitable conditions, and second, the formation of ammonia and its compounds by means of the action of water or steam on the nitrogen containing material. The residual material may then be calcined if desired. All of said described steps or processes may be carried on in close succession and in the same apparatus.

It is of special advantage that the steps in the production of ammonia and its compounds, for example, be carried on in close succession and in the same apparatus since, by so doing, a great saving of time results, deterioration of the material is prevented and great economy of heat is effected.

Further, the reactions that take place between steam and water and the nitrogen containing material may be much more easily regulated, since the material may, for example, be cooled to any desired temperature in an atmosphere of steam or nitrogen or kept at a desired temperature in an atmosphere of steam or raised through any desired temperature range in an atmosphere of steam, nitrogen or any desired gas or vapor according to the particular result desired. The series of reactions may be influenced in any desired way by the employment of a suitable catalyst or mixture of catalysts.

For the purpose of clear illustration of a preferred manner of carrying out my improved process, I will describe a form of apparatus which may be employed to advantage in carrying out the process and will then describe the several steps of the process as they may be carried out in said apparatus. It is to be understood, however, that the apparatus here referred to is described merely for convenience to make clear to those skilled in the art one means by which the process may be advantageously and practically carried out.

In the accompanying drawings which illustrate such form of apparatus,

Figure 1 is a longitudinal sectional view of a furnace for carrying out this process;

Fig. 2 is a transverse sectional view of the furnace on the line 2—2, Fig. 1;

Fig. 3 is a longitudinal sectional view of one of a number of trays in which the material may be held in the furnace;

Fig. 4 is a fragmentary plan view of said tray; and

Fig. 5 is a perspective view of a charging rack or carrier for carrying the trays into and out of the heating chamber of the furnace, as well as supporting them within the furnace during the several reactions on the material.

In the embodiment of apparatus herein selected for illustration and referring particularly to Fig. 1 of the drawing, the numeral 1 indicates the furnace in general. This furnace may be of the regenerator form and may comprise a plurality of heating chambers, one of which is indicated at 2, said chambers each having end doors 3 at either end respectively, and a top 4, in which is mounted an outlet pipe 5, by which the gases or vapor products of the reactions within the heating chamber may be discharged. In the construction here shown, a covered trap or vessel 6 is provided which is preferably filled with oil or other suitable fluid to the level above the discharge end 7 of the outlet pipe and a second discharge pipe 8 enters said trap and terminates above the level of the liquid therein, whereby the desired gaseous product of the heating chamber may be conducted to a suitable container.

Extending from one end of the heating chamber is a supporting platform 9 which is flush with the floor of the chamber and forms a support and guide as desired for the charging rack or cage by which the material is charged into and withdrawn from the heating chamber.

In order that the gases or vapors with which the material, such as carbid is to be treated, may have free access to all parts of said material, it is desirable that the material or carbid be distributed in divided masses within the heating chamber, the material being preferably spread in comparatively thin and separated layers so that the gas or vapor may act quickly upon the same.

To this end, therefore, I provide a suitable form of charging rack or cage so constructed and arranged as to support thereon more or less shallow trays within which the material is contained. In the form of this invention here particularly illustrated, this charging rack or cage may comprise a suitable frame work consisting of a skeleton body or frame, having mounted thereon, several uprights 11, which are bound together on each side of the rack by a plurality of longitudinal stringers or side frame members 12 and these side frames and the rack so formed are connected and strengthened by cross members 13 at top and bottom, see Fig. 5. The longitudinal stringers or frame members 12 are preferably of angle iron construction, the vertical flanges 14 of which are riveted or otherwise fastened to the upright frame members 11 and the laterally extending flanges 15 of which form supports for the tray containing material to be treated. These charging racks or cages may be provided with suitable rollers 16 by which the rack is easily run into and out of the heating chamber.

Referring now to Figs. 3 and 4, particularly, the trays for supporting the material within the heating chamber, consist preferably of more or less shallow pans 17, the bottom and side walls of which are perforated throughout to permit of free access of gas or vapor to the material contained therein. In order that the material, if in the form of more or less small particles, may not fall through the perforations of the tray, each tray may, if necessary, be provided with a layer 18 of meshed material, such as wire mesh screen, which overlies the perforated bottom of the tray and may, if necessary, be extended up over the perforated sides of the tray.

During the treatment of the material such as carbid while supported on the tray within the heating chamber, reactions occur which may cause the swelling or expanding of the material. In order to allow for such swelling or expansion without injury to the tray, the side walls thereof are flared or slanted upwardly if necessary, as shown in Fig. 3.

From the above description of the construction of the charging rack and of the manner in which the trays are supported thereon, it will be seen that said trays are separated, one from the other, whereby the gas or vapor with which the heating chamber is charged may have free access to every part of the material in the trays and inasmuch as this material is more or less thinly spread out in said trays, the gas or vapor will readily permeate and saturate the material.

The outlet pipe 5 leading from the heating chamber may be provided with a valve or other controlling means 19, by which the discharge of the products of reaction in vapor or gaseous form may be controlled.

The nitrogen or other gas or the steam or vapor may be supplied to the heating chamber or chambers.

In Fig. 1, the charging rack is indicated in dotted outline as withdrawn from the heating chamber and resting upon the platform 9. Any suitable form of ram or other means (not shown) may be employed for shifting the charging rack into and out of the heating chamber.

The particular apparatus herein described forms the subject-matter of my companion application, Serial No. 192,482 filed on the 21st day of September, 1917.

In describing the manner of using the apparatus heretofore referred to, I will use the treatment of calcium carbid with nitrogen to form calcium-carbon-nitrogen compounds and the treatment of the compound so formed with steam for the production of ammonia and ammonium compounds and calcium compounds and free carbon residues as a typical illustration of my improved process.

The process may be carried out in detail in the following manner: The closed heating chamber or oven, containing the carbid, filled with nitrogen gas under slight pressure by direct connection with the nitrogen gosometer or nitrogen supply, is raised to a temperature of approximately 1000° C. This temperature is maintained until the carbid is practically saturated and ceases to absorb any material quantity of nitrogen. The source of heat is then cut off and the heating chamber or oven and its contents are allowed to cool in an atmosphere of nitrogen. During this period of cooling the last traces of carbid are converted into nitrogen compounds.

When the oven is cooled to a temperature where the material can be treated with steam, the nitrogen is shut off and steam at proper temperature and pressure is admitted by which the material is further cooled, if necessary, to the temperature best suited for further treatment. In carrying out the process described in the Taylor- Knapp application, Serial No. 191,185, filed September 15, 1917, it is necessary to cool the oven and the material contained therein to a point below 350° C. before admitting steam.

In carrying out my process I need cool the heating chambers or ovens and the material therein, only to approximately 450° C. or the temperature most suitable for the conversion of the nitrogen contained in the compound into ammonia and its compounds. The temperature maintained during the evolution of ammonia or ammonium compounds may be within the range below 600° C. The treatment with steam is preferably to be carried on at atmospheric pressure but obviously may run at times above atmospheric pressure.

Before admitting steam and after the nitrogen is shut off the valve 19 on the hydraulic main 5 is opened for the purpose of conducting the ammonia and ammonium compounds and moisture to the concentration or absorption apparatus.

The heating chamber or oven is maintained at approximately 450° C. until the ammonia ceases to form when the steam is shut off and either the heating chamber or oven is opened and the rack is removed, the trays emptied, refilled with carbid and after charging in the oven the cycle begins again; or the heat is first raised to approximately 850° C. to remove all moisture and most of the carbonic acid gas from any calcium carbonate previously formed, thus calcining the residual product.

From the above described process it will be seen that the desired final product may be produced by a continuous series of steps in a single apparatus and in the most efficient and economical manner in point of time, possible deterioration of the material and in a manner permitting close regulation of the conditions under which the several steps of the process are performed.

While I have herein described the particular manner of carrying out my improved process and the particular order in which the steps may be performed, likewise a particular form of apparatus in which the process may be carried on, it is to be understood that such specific description is merely illustrative and that the details herein described can be varied to any desired and practical extent within the scope of the appended claims.

Having described the invention what is claimed is:—

1. The process for the production of ammonia and its compound from a carbid and nitrogen which comprises carrying out all of the necessary reactions in a continuous series of operations and in one apparatus.

2. The process for the production of ammonia and its compounds, which comprises treating calcium carbid with nitrogen gas, subjecting this nitrified material to the action of steam and recovering the ammonia evolved in a series of operations in the same apparatus.

3. The process for the production of ammonia and its compounds and the calcining of the residual material, which comprises treating a carbid with nitrogen gas, subjecting this nitrified material to the action of steam until the ammonia formation is substantially complete while recovering the evolved ammonia and then raising the temperature of the mass to a point sufficient to expel all of the water and substantially all of the carbon dioxid from the residual material.

4. The process for the production of ammonia and its compounds and the calcining of the residual material which comprises the following steps or reactions in a continuous series of operations, namely, treating a carbid with nitrogen gas at temperatures suitable for the absorption of the nitrogen, cooling the nitrified material to a suitable temperature and treating with steam to cause the production of ammonia and its compounds while collecting the evolved ammonia and its compounds, and raising the temperature of the furnace and its contents to temperatures suitable for expelling the water and substantially all the carbon dioxid from the residue.

5. The process for the production of ammonia and its compounds and the calcining of the residual material, which comprises the following steps or reactions in a continuous series of operations, namely; treating a carbid with nitrogen gas at a temperature not in excess of 1000° C., cooling the nitrified material, treating this nitrified material with steam below 600° C. while recovering the evolved ammonia, and raising the temperature of the furnace and its contents to approximately 850° C. whereby the water and substantially all the carbon dioxid are expelled from the residue.

6. The process for the production of ammonia and its compounds, which comprises the following steps or reactions in a continuous series of operations, namely, treating a carbid alone or a carbid mixed with a catalyst with nitrogen gas or nitrogen containing catalytic vapors or gases at temperatures suitable for the absorption of the gas by the carbid, cooling the nitrified material to a temperature suitable for treating it with steam, and treating this nitrified material with steam at temperatures suitable for producing ammonia and its compounds while recovering the evolved products.

7. The process for the production of ammonia and its compounds and the calcining of the residual material, which comprises the following steps or reactions in a continuous series of operations, namely, treating a carbid with nitrogen gas at a temperature not in excess of 1000° C., cooling the nitrified material to substantially 450° C., and treating this nitrified material with steam between 450° C. and 600° C. while recovering the evolved ammonia.

8. The process for the production of ammonia and its compounds, which consists in treating a carbid with nitrogen gas while heating the carbid to a temperature sufficient to cause the substantial saturation thereof with the gas, maintaining said temperature until saturation is substantially completed, cooling the mass by means of steam, and continuing the treatment with steam until the evolution of ammonia is completed.

9. The process for the production of ammonia which comprises heating a carbid in an atmosphere of nitrogen gas at a temperature necessary to cause substantial saturation of the carbid with the nitrogen, and treating the nitrified material with steam at atmospheric pressure until the evolution of ammonia is completed.

10. The process for producing ammonia and calcining the residual material which comprises heating the carbid in an atmosphere of nitrogen gas, cooling the nitrified material by means of the nitrogen gas, subjecting the cooled mass to the action of steam until the ammonia formation is substantially complete, and raising the temperature of the mass to a point sufficient to expel all the water and substantially all the carbon dioxid from the residual material.

11. The process for the production of ammonia which comprises treating a carbid with nitrogen gas in the presence of heat until the carbid is substantially saturated with said gas, cooling the nitrified material with steam, and continuing the treatment with steam until the evolution of ammonia is substantially complete.

12. The process for the production of ammonia which comprises combining the following steps or reactions in a continuous series of operations, namely, treating a carbid with nitrogen gas at temperatures suitable to cause the absorption of the gas, cooling the nitrified material by means of nitrogen to temperatures suitable for treatment of the material with steam, and treating this nitrified material with steam at temperatures suitable for the production of ammonia and its compounds while recovering the evolved products.

13. The process for the production of ammonia which comprises combining the following steps or reactions in a continuous series of operations, namely, treating a carbid with nitrogen gas at a temperature not in excess of 1000° C., cooling the nitrified material by means of nitrogen to substantially 450° C., and treating this nitrified material with steam between 450° and 600° while recovering the evolved ammonia.

14. The process for the production of ammonia and ammonium compounds, which comprises combining the following steps or reactions in a continuous series of operations, namely, treating the carbid mixed with a catalyst with nitrogen gas at temperatures suitable to cause the absorption of the gas, cooling the nitrified material by means of steam to a temperature suitable for evolution of ammonia and its compounds by said treatment with steam, and continuing the treatment with steam until ammonia and its compounds have been evolved to the desired extent while recovering the evolved product.

15. The process for the production of ammonia which comprises combining the following steps or reactions in a continuous series of operations, namely, treating a carbid with nitrogen gas at a temperature not in excess of 1000° C. cooling the nitrified material by means of steam to substantially 450° C., and continuing the treatment with steam between 450° C. and 600° C. while recovering the evolved ammonia.

16. The process for the production of ammonia and the calcining of the residual material which comprises treating a carbid with nitrogen gas, cooling the nitrified material by further treatment with nitrogen gas, treating the cooled material with steam until the ammonia formation is substantially complete while recovering the evolved ammonia, then raising the temperature of the mass to a point sufficient to expel all the water and substantially all the carbon dioxid from the residual material.

17. The process for the production of ammonia and the calcining of the residual material which comprises treating a carbid with nitrogen gas, cooling the nitrified material by means of steam to a point at which decomposition of ammonia will not take place, continuing the treatment of steam until the ammonia formation is substantially complete while recovering the evolved ammonia and then raising the temperature of the mass to a point sufficient to expel all the water and substantially all carbon dioxid from the residual material.

In testimony whereof, I the said FRANK L. SLOCUM have hereunto set my hand.

FRANK L. SLOCUM.

Witnesses:
CHARLES R. WRIGHT, Jr.,
FLOYD R. CORNWALL.

It is hereby certified that Letters Patent No. 1,315,532, granted September 9, 1919, upon the application of Frank L. Slocum, of Pittsburgh, Pennsylvania, for an improvement in "Processes of Treating Material with Gas or Vapor," were erroneously issued to the inventor, said Slocum, as sole owner of said invention, whereas said Letters Patent should have been issued to *James Henry Reid, of Pittsburgh, Pennsylvania, as assignee of the entire interest in said invention*, as shown by the record of assignments in this office; and that the said Letters Patent should be read with this correction therein that the same may conform to the record of the case in the Patent Office.

Signed and sealed this 25th day of November, A. D., 1919.

[SEAL.]

M. H. COULSTON,
*Acting Commissioner of Patents.*

Cl. 23—21.

Certificate of Correction.

It is hereby certified that Letters Patent No. 1,315,532, granted September 9, 1919, upon the application of Frank L. Slocum, of Pittsburgh, Pennsylvania, for an improvement in "Processes of Treating Material with Gas or Vapor," were erroneously issued to the inventor, said Slocum, as sole owner of said invention, whereas said Letters Patent should have been issued to *International Nitrogen Company, a Corporation of Delaware*, said corporation being assignee, *by mesne assignments*, of the entire interest in said invention, as shown by the records of assignments in this office; and that the said Letters Patent should be read with this correction therein that the same may conform to the record of the case in the Patent Office.

This Certificate supersedes Certificate of Correction issued November 25, 1919.

Signed and sealed this 25th day of April, A. D., 1922.

[SEAL.]

KARL FENNING,
*Acting Commissioner of Patents.*